Feb. 27, 1962 R. H. COLLEY 3,022,629
EXHAUST NOZZLE CONTROL FOR A TWIN SPOOL JET ENGINE
Filed Nov. 24, 1959 2 Sheets-Sheet 1

Inventor
ROWAN HERBERT COLLEY
By
Cushman, Darby & Cushman
Attorneys

Feb. 27, 1962  R. H. COLLEY  3,022,629
EXHAUST NOZZLE CONTROL FOR A TWIN SPOOL JET ENGINE
Filed Nov. 24, 1959  2 Sheets-Sheet 2
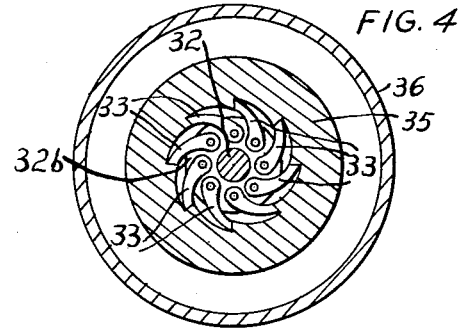
FIG. 4
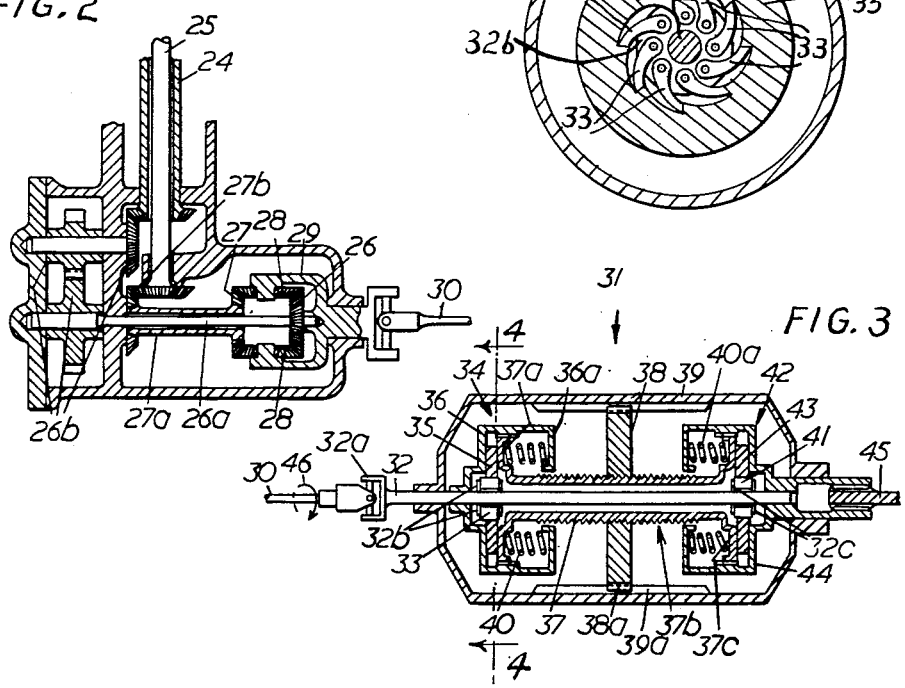
FIG. 2
FIG. 3
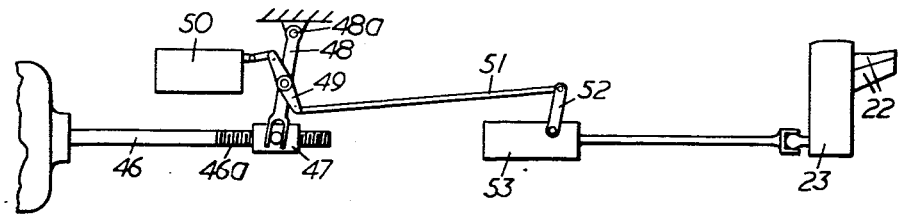
FIG. 5
Inventor
ROWAN HERBERT COLLEY
By
Cushman, Darby & Cushman
Attorney 3,022,629
Patented Feb. 27, 1962

---

3,022,629
EXHAUST NOZZLE CONTROL FOR A TWIN SPOOL JET ENGINE
Rowan Herbert Colley, Sunny Hill, Derby, England, assignor to Rolls-Royce Limited, Derby, England
Filed Nov. 24, 1959, Ser. No. 855,102
Claims priority, application Great Britain Dec. 5, 1958
1 Claim. (Cl. 60—35.6)

This invention relates to a gas turbine engine, and in particular to an engine having a propelling nozzle and having two rotor shafts rotating at different rotational speeds in which the ratio of the rotational speeds must be maintained constant.

According to the present invention a two-shaft gas turbine engine includes means for maintaining the speed ratio of the two rotor shafts constant by variation of the effective area of the propelling nozzle.

According to a feature of the invention a signal corresponding to the speed of each rotor shaft is fed to a device which produces an output signal corresponding to the difference in speeds between the said shafts, said output signal being used to operate means for varying the effective area of the propelling nozzle.

The signals corresponding to the speed of each rotor shaft can be produced as a mechanical shaft rotation and said device can be a differential gear mechanism.

According to one particular arrangement of the invention each rotor shaft is arranged to drive the sun gears of a differential gear train the output from which is arranged to operate means for varying the effective area of said propelling nozzle.

Preferably one shaft of the gas turbine engine is the low pressure rotor shaft which connects the low pressure turbine with the low pressure compressor and the other shaft is the high pressure rotor shaft connecting the high pressure turbine with the high pressure compressor.

The low pressure rotor shaft is preferably arranged also to drive a first sun gear of said differential gear train and said high pressure shaft is arranged to drive a second gear in the opposite direction of rotation to the said first sun gear, the gear ratios being arranged such that at a preselected value of the ratio of the rotational speeds the output shaft from the differential gear train is stationary, any variation from said preselected ratio causes said output shaft to rotate thereby to operate said means for modifying said nozzle effective area in order to restore said preselected ratio.

The arrangement is such that overspeeding of said low pressure rotor causes the effective area of said propelling nozzle to be reduced and vice versa.

Preferably said output shaft of the differential gear train is arranged to drive said means for varying the effective area of said propelling nozzle through clutch means so that when said means for varying the effective area reaches the position in which the effective area is either a maximum or minimum and the speed ratio of the two shafts has not reached said preselected speed ratio then the drive from said output shaft to said area varying means is discontinued in one direction.

The clutch means may include two clutch plates and freewheels arranged such that when the drive from said output shaft in one direction of rotation is discontinued the output shaft is still connected with said area varying means for rotation in the opposite direction.

Said area varying means may be a finger type nozzle in which flap members pivoted to the jet pipe are caused to swing radially inwards in order to reduce the effective area of said nozzle or caused to swing radially outwards in order to increase said effective area.

The output from said clutch means may directly operate the means for moving the flap members.

The output from said clutch means may operate as a trim device, said flap members being moved by separate operating means such as an air motor.

The invention will now be described with reference to the accompanying drawings, in which:

FIGURE 2 illustrates in more detail the means for maintaining the preselected speed ratio;

FIGURE 3 is an elevation view, in section, of the clutch assembly;

FIGURE 4 is a view taken substantially along line 4—4; and

FIGURE 5 illustrates an arrangement in which the speed ratio of the two shafts acts as a trimming device on the nozzle area varying means.

Figure 1:
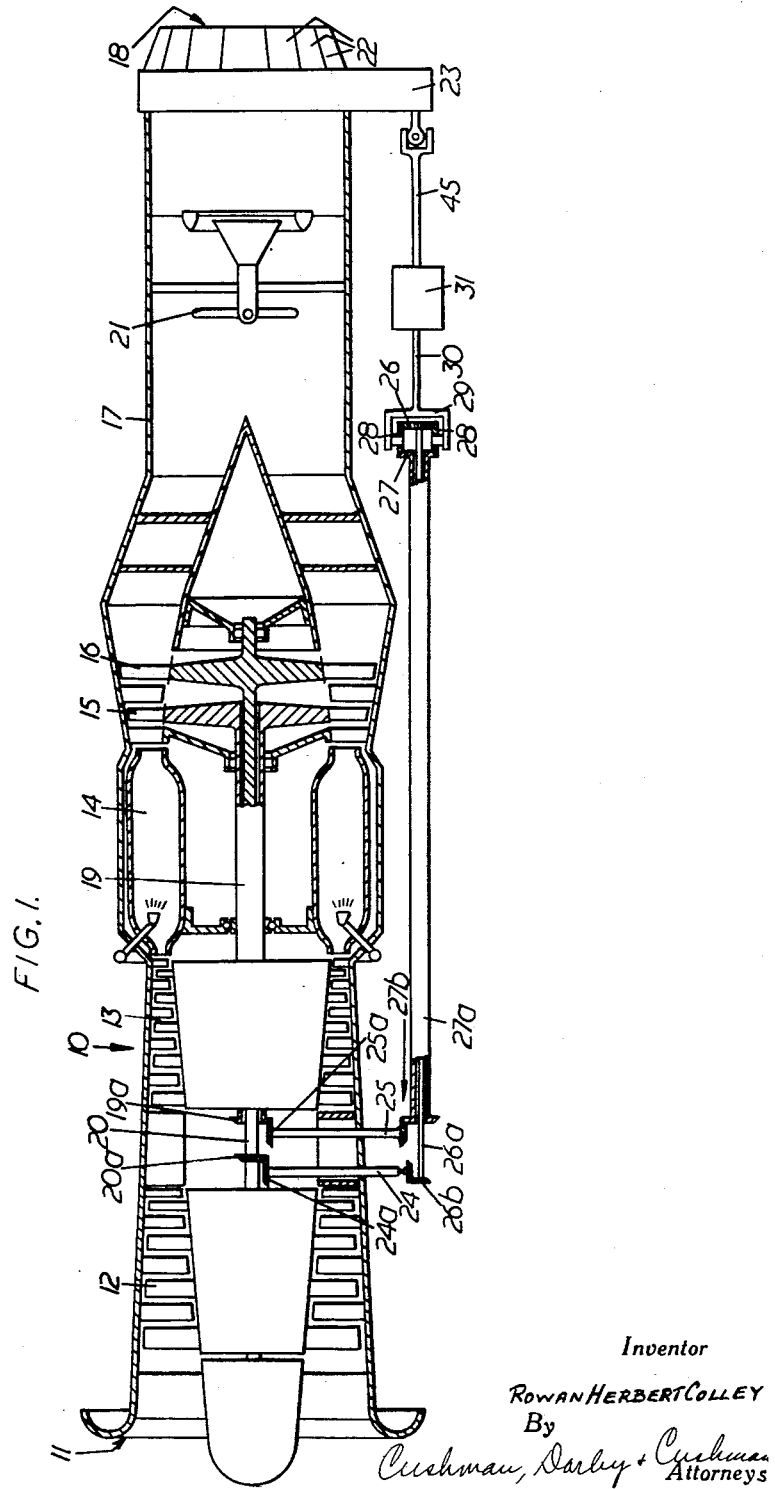
FIGURE 1 illustrates diagrammatically a two-shaft gas turbine engine provided with means for maintaining the selected speed ratio of the two shafts constant in accordance with the present invention.

A gas turbine engine 10 is shown in FIGURE 1 comprising an air intake 11 through which the air passes to a low pressure compressor 12 where it is initially compressed before passing to a high pressure compressor 13 which delivers to combustion equipment 14 where fuel is burned with the air, the products of combustion passing first through a high pressure turbine 15 to drive it and then through a low pressure turbine 16 before flowing through a jet pipe 17 and a propelling nozzle 18 to atmosphere.

The high pressure compressor 13 is driven from the high pressure turbine 15 by a high pressure shaft 19 and the low pressure compressor 12 is driven from the low pressure turbine 16 by a low pressure shaft 20 which passes through the high pressure shaft 19.

The jet pipe 17 is provided with fuel injectors 21 for injecting fuel into the gases passing therethrough in order to reheat the gases before they pass to atmosphere through the propelling nozzle 18. The propelling nozzle 18 is provided with a series of flap members 22 pivoted at their upstream ends to the jet pipe 17. The members 22 are caused to pivot radially inwardly in order to reduce the effective area of the propelling nozzle 18 and are caused to swing radially outwards in order to increase the effective area of the nozzle. Movement of the flap members 22 is caused by an operating mechanism 23 which surrounds the propelling nozzle 18.

In the type of gas turbine engine just described the high pressure rotor system will have a rotational speed greater than that of the low pressure rotor system and it is desirable that the speed ratio of the two rotor systems be kept to a predetermined constant ratio. This is achieved by controlling the rotational speed of the high pressure rotor system by a governor which controls the fuel flow to the combustion equipment 14, and by controlling the low pressure rotor system by the method described herein to give correct engine operating conditions.

The low pressure rotor shaft 20 is provided with a pinion 20a in driving connection with a gear 24a fixed to one end of an external drive shaft 24 and the high pressure shaft 19 is provided with a pinion 19a in driving connection with a gear 25a fixed to one end of a second external drive shaft 25. The shaft 24 is arranged to drive a sun gear 26 through a shaft 26a and gears 26b and the shaft 25 is arranged to drive a sun gear 27 in the opposite direction of rotation to the sun gear 26 through a shaft 27a and gears 27b. The ratios of gears 26b and 27b are arranged such that a preselected value of the ratio $N_{HP}/N_{LP}$ the shafts 26a and 27a rotate at equal speeds in opposite directions. The term $N_{HP}$ indicates the rotational speed of the high pressure rotor system and the term $N_{LP}$ indicates the rotational speed of the low pressure rotor system.

Sun gears 26 and 27 mesh with planet gears 28 carried on a planet carrier 29 and it will be seen that when the shafts 26a, 27a rotate at equal speeds the planet carrier 29 will remain stationary.

The planet carrier 29 is connected to an operating rod 30 which at its end remote from the planet carrier 29 is connected to a clutch device 31 the output from which is arranged to move the operating mechanism 23 causing the flap members 23 to either increase or decrease the effective area of the propelling nozzle 18.

If during operation of the engine the low pressure rotor system tends to overspeed then the shaft 26a will tend to rotate faster than the shaft 27a and in the opposite direction. The sun gear 26 will apply a torque to the planet carrier 29 causing it to rotate, this in turn will rotate the operating rod 30 and a drive will be applied through the clutch member 31 causing the operating mechanism 23 to move the pivoted flap members 22 radially inwards to reduce the effective area of the propelling nozzle 18.

By reducing the nozzle area the pressure within the jet pipe will increase which will create a back pressure on the low pressure turbine 16 and reduce its rotational speed. Therefore the speed of the low pressure rotor system will fall until the preselected ratio $N_{HP}/N_{LP}$ is restored. When the ratio is restored the planet carrier 29 will become stationary and the drive to the operating mechanism 23 will be discontinued.

Like-wise if the rotational speed of the low pressure rotor tends to fall the sun gear 27 will rotate the planet carrier in the opposite direction and the flap members 22 will be moved to increase the effective area of the propelling nozzle 18 thus reducing the back pressure on the low pressure turbine 16 causing the low pressure rotor system to increase in rotational speed in order to restore the preselected ratio $N_{HP}/N_{LP}$.

When reheat is required, fuel is injected into the jet pipe 17 through the fuel injectors 21 and this fuel is ignited and burned in the jet pipe 17. The pressure in the jet pipe 17 will rise and this will tend to reduce the rotational speed of the low pressure rotor system which will cause the planet carrier 29 to rotate causing the flap members 22 to move outwards thereby increasing the effective area of the propulsion nozzle 18 until correct engine operating conditions are restored.

FIGURE 2 illustrates in more detail the differential gear train and the clutch device 31. The external drive shafts 24 and 25 are arranged concentric, the external drive shaft 25 from the high pressure rotor system passing through the hollow external drive shaft 24 of the low pressure rotor system. The external drive shaft 25 drives the sun gear 27 through gears 27b and shaft 27a and the external drive shaft 24 drives sun gear 26 through gears 26b and shaft 26a. The gears 26b are arranged to be of different dimensions in order that small changes in the predetermined speed ratio of the engine can be achieved by changes in the numbers of teeth. The sun gears 26 and 27 are arranged to drive the planet carrier 29 as described with reference to FIGURE 1.

The clutch device 31 is provided with an input drive shaft 32 which is connected to the operating rod 30 by means of a coupling device 32a and the shaft 32 is provided with two pairs of radially extending flanges 32b and 32c. A free-wheel mechanism is interposed between the input drive shaft 32 and a clutch device 34, which may for instance include a number of spring loaded pawls 33 pivoted to the flanges 32b.

The clutch 34 comprises a clutch plate 35 whose inner periphery is provided with or forms the driven member, which may include a number of teeth, of the free-wheel, and the plate 35 is sandwiched between a member 36 and a radial flange 37a provided at the end of a sleeve 37 which surrounds the shaft 32. The sleeve 37 is provided along part of its length with a screw thread 37b which mates with an internal screw thread provided on a braking disc 38.

The disc 38 is provided at its outer periphery with a number of axial splines 38a which engage between axial splines 39a provided on a fixed outer casing 39. The member 36 and radial flanges 37a are each urged into engagement with the axially facing surfaces of the clutch plate 35 by means of springs 40 located between the flange 37a and an inwardly directed flange 36a provided on the member 36.

The pair of radially extending flanges 32c carry a free-wheel device such as a number of pawls 41 pivoted to them to form a free wheel mechanism between the input drive shaft 32 and a second clutch device 42. The clutch device 42 is similar to the clutch device 34 and comprises a clutch plate 43 having at its inner periphery the driven portion of the free wheel and the clutch plate 43 is sandwiched between a member 44 and a second radial flange 37c provided at the end of the sleeve 37. Springs 40a urge the flange 37c and member 44 into engagement with the clutch plate 43 and the member 44 is in splined engagement with an output shaft 45 which is connected at its other end to the operating ring 23.

The free-wheel mechanisms are arranged to drive in opposite directions of rotation such that when one is free-wheeling the other is in driving connection with the corresponding clutch plates.

In operation of the clutch device 31 if the operating rod 30 is driven, say, in the direction of arrow 46 by means of the differential gear train the input drive shaft 32 will also be rotated in the same direction and the pawls 33 will engage the teeth provided on the clutch plate 35 thus causing it to rotate with the shaft 32 and as the clutch plate 35 is in driving connection with the member 36 and the radial flange 37a a drive will be transmitted to the sleeve 37 which in turn will drive the member 44 thus causing the output shaft 45 to rotate and operate the ring 23 so moving the flap members 22 in order to vary the effective area of the nozzle 18. It will be appreciated that in this direction of rotation the pawls 41 will not be in driving connection with the clutch plate 43.

As the sleeve 37 is rotated the braking disc 38 will move along the screw thread 37b until it abuts outer surface of the inwardly directed flange 36a and the friction between the abutting surface will slow down the rotation of the member 36. When the braking disc 38 abuts the flange 36a the sleeve 37 will tend to screw itself through the braking disc 38, towards the right as shown in the drawing, and this movement will compress the springs 40 so reducing the force urging the flange 37a and member 36 towards the clutch plate 35 thereby allowing the clutch plate 35 to slip. If the input shaft continues to rotate no further drive is transmitted to the output shaft 45 and therefore the operating mechanism for moving the flap members 22 will not be strained. It will be appreciated that the drive to the operating ring is therefore disconnected when the flap members have reached their maximum position.

If after disconnecting the drive in the direction of arrow 46 the operating rod 30 is rotated in the opposite direction the pawls 41 will drive the clutch device 42 and the sleeve 37 will therefore rotate causing the braking disc 38 to move along the screw thread 37b until it abuts the member 44 and then the drive to the output shaft 45 will be discontinued in the manner described for the clutch 34.

Referring now to FIGURE 3 the output from the planet carrier 29 is connected to drive a shaft 46 which at its end remote from the planet carrier has a screw threaded portion 46a which engages with an internal screw thread formed in a sleeve 47. The sleeve 47 is connected to one end of a link 48 pivoted to fixed structure at 48a.

Pivoted to the center of link 48 is a second link 49 which is connected at one end to a control unit 50 and at its other end to a rod 51 which operates a control lever 52 controlling the movement of a servo device such as an air motor 53. The air motor is connected with the operating mechanism 23 of the variable area nozzle.

In this arrangement the drive from the planet carrier 29 is used as a trim on the nozzle area. When re-heat is required the nozzle control unit 50 is set by the pilot to move link 49 thus moving the control lever 51 allowing the air motor 53 to operate the operating mechanism 23 thereby moving the flap members 22 to a position of larger nozzle area.

It will be seen therefore that with this arrangement when reheat is required the nozzle area is selected to an approximately correct amount by the pilot and during both reheat and non-reheat operation the effective area is trimmed in accordance with the ratio $N_{HP}/N_{LP}$.

The arrangements just described are suitable for use with any form of two-shaft engine with or without means for reheating the exhaust gases. The nozzle area varying means may be of any known construction, it may consist of an annular arrangement of flap members or it may consist of a flap member or members whose total peripheral extent is a minor proportion of the total peripheral extent of the nozzle outlet.

I claim:

In a gas turbine engine including a jet pipe for defining a working fluid passage, the combination comprising: a low pressure compressor rotor; a high pressure compressor rotor; a low pressure turbine; a high pressure turbine; a first shaft means drivingly connecting said low pressure compressor rotor with said low pressure turbine; a second shaft means drivingly connecting said high pressure compressor rotor with said high pressure turbine for independent rotation with respect to said first-mentioned shaft means; means for maintaining a predetermined constant speed ratio between said low and high pressure compressor rotors throughout an operating region of said engine, said last-mentioned means including a variable area discharge nozzle, and control means responsive to a variation from the constant speed ratio, including a differential gear mechanism having its input operatively connected to said rotors, said mechanism having an output shaft means operatively connected to said variable area discharge nozzle, a pair of overrunning clutches interposed between said mechanism and said discharge nozzle, one of said clutches, when overrunning determining the maximum area of said discharge nozzle and the other of said clutches when overrunning determining the minimum area of said discharge nozzle.

References Cited in the file of this patent
UNITED STATES PATENTS

| | | |
|---|---|---|
| 2,504,018 | Gibson | Apr. 11, 1950 |
| 2,641,324 | Fortescue | June 9, 1953 |
| 2,699,646 | Baker | Jan. 18, 1955 |
| 2,726,507 | Baker | Dec. 13, 1955 |
| 2,785,848 | Lombard | Mar. 19, 1957 |
| 2,873,576 | Lombard | Feb. 17, 1959 |
| 2,944,387 | Hall | July 12, 1960 |